United States Patent
Duraiswami et al.

(10) Patent No.: US 6,616,873 B1
(45) Date of Patent: Sep. 9, 2003

(54) PROCESS FOR MAKING MACRO POROUS CERAMIC SPHERES

(75) Inventors: Venkateswaran Duraiswami, Thane (IN); Vajifdar Parvez, Thane (IN); Cursetji Rustom Minocher, Thane (IN); Chatterjee Anjan Kumar, Humbai (IN)

(73) Assignee: Associated Cement Companies Ltd., Maharashtra (IN)

(*) Notice: Subject to any disclaimer, the term of this patent is extended or adjusted under 35 U.S.C. 154(b) by 0 days.

(21) Appl. No.: 09/890,724
(22) PCT Filed: Dec. 1, 2000
(86) PCT No.: PCT/IN00/00117
§ 371 (c)(1), (2), (4) Date: Aug. 1, 2001
(87) PCT Pub. No.: WO01/39887
PCT Pub. Date: Jun. 7, 2001

(30) Foreign Application Priority Data

Dec. 2, 1999 (IN) .................................................. 887/99

(51) Int. Cl.$^7$ ............................................... B29C 65/00
(52) U.S. Cl. ........................................ 264/44; 264/628
(58) Field of Search ............................... 264/42, 43, 44, 264/628, 632, 635, 605

(56) References Cited

U.S. PATENT DOCUMENTS

| 5,064,783 A | * | 11/1991 | Luckevich | 501/12 |
| 5,401,445 A | * | 3/1995 | Menchhofer | 264/13 |
| 5,419,860 A | * | 5/1995 | Menchhofer | 264/109 |

* cited by examiner

Primary Examiner—Christopher A. Fiorilla
(74) Attorney, Agent, or Firm—Dickstein, Shapiro, Morin & Oshinsky LLP

(57) ABSTRACT

Process for making thermally stable macro porous spheres with or without central core cavity includes steps of homogenizing dry pulverized selective constituents with or without burnable core particles and with <25% combustibles; sprinkling over pan pelletizer wetted with PVA aqua sol binder and rolling to form spheres having <25% moisture and dry compacting in pelletizer before oven drying at 90–100° C. until moisture and core particles are partially destroyed and sintering under rotary motion of the spheres for 45–60 minutes at 1350–1380° C. before being rapidly cooled down to ambient temperature and sieving and recovering therefrom low-to-high temperatures >90% loose fill macro porous spheres for catalyst and moulded bricks/monoliths forming refractory insulation applications.

13 Claims, 2 Drawing Sheets

PROCESS FOR MAKING MACRO POROUS CERAMIC SPHERES

This application is a 371 of PCT/IN00/00117 filed Dec. 1, 2000.

TECHNICAL FIELD

This invention relates to a process for making low density abrasion and high temperature resistant, open/closed cellular spheres with or without a central core cavity inter and cross linked to zigzag pore conduits formed in sphere wall of desired thickness having high crush strength and forming low-to-high temperature loose fill spheres for use as catalyst carriers or for being moulded to form refractory bricks/monoliths for use in a wide range of mobile or stationary and other refractory applications.

DEFINITIONS

The following expressions wherever appearing throughout this specification shall include the meaning set there against as under:

"Indialite Spheres'—means low-to-high temperature loose fill and moulded macro porous spheres made by the process of this invention.

'PVA Aqua Sol' means cold water soluble inorganic binder with 2% low ash content of PVA (Poly-Vinyl-Alcohol)

'Burnable core' means herein stated organic/inorganic filler/binder mass forming burnable core particles.

PRIOR ART BACKGROUND

It is known that the catalyst carrier materials used for oxidation/reduction reaction possess high stability. High porosity of inert ceramic carrier enables applications as well as anchoring of any other high surface area enhancing materials such as 'Gamma' or 'Theta' Alumina which in turn increases the degree of dispersion of the catalyst species.

These dispersions retard activity loss from agglomeration or coalescence of catalyst species during sintering and increase the availability of catalyst surface area for catalytic reactions.

The use of a wide variety of inorganic refractory metal oxides and metal oxide mixtures as catalysts supports is well known in chemical engineering and such supports are made in many forms such as loose fill packing of spheres of uniform or different sizes, rings and the like, or entire structures in reticule or honeycomb and the like form.

These supports have been utilised for carrying metal catalysts such as Pt, Pd, Rh and the like and base metal catalysts including alumina, magnesia, titania and the like either alone or any desired admixtures thereof.

Therefore, it is obviously desirable that the catalyst carrier should possess high geometric surface area, and should preferably be able to promote a degree of turbulence in order that reacting fluids or gases passing through the catalytic bed encounter as much reactive catalytic surface as possible during residence time of reaction mixture in catalyst bed.

On the other hand it is also necessary that the catalyst bed should present very little resistance to the flow of reacting fluids or gases while passing through the packed column of catalyst bed. Both the above requirements are contradictory to each other and hence an optimal combination of the two factors is necessary for achieving the best results.

It is known that catalyst carriers, in general, are inactive with decreasing level of porosity for use in conjunction with high surface area coating on which the catalyst carrier can be distributed to produce desired level of gases or fluids that come in contact with them while being circulated through said carriers in catalvst bed. To enable strong adherence of said high surface area coating, the carrier material should also have optimal pore structure and pore size distribution.

Many catalyst carriers are known in prior art, as catalvst support in the form of spheres or otherwise shaped monoliths such as honeycomb monoliths. For example, C. F. Schafer and R. C. Bedford have described an alumina based thermally stable catalyst carrier described in U.S. Pat. No. 4,31,565.

Many such patents on catalyst supports are predominant but they principally deal with active alumina. Most of the earlier references on catalvst carriers referring to 'Cordierite' composition deal with honey-comb shapes and rarely on 'Cordierite' spheres.

Numerous patents on 'Cordierite' honeycomb shapes are known in the prior art for instance:

U.S. Pat. No. 5,549,725 discloses a process for making a 'Cordierite' ceramic honeycomb for use as filter material.

U.S. Pat. Nos. 5,773,103 and 4,871,693 disclose methods of making porous 'Cordierite' ceramic formed from hollow spherical glass ceramic powders that are obtained through spray thermal decomposition of expensive organic or aqueous-organic solvents, as starting materials.

U.S. Pat. No. 4,37,044 provides a method for preparation of 'Cordierite' bead type support structure with a raspberry-like or dimpled surface having high decree of macro porosity in which colloidal silica has been used to create raspberry-like dimpled surface. Though the use of such raspberry-like sphere surface enhances the geometric surface it is prone to attrition in turbulent flow of gases and the sharp edged sphere surface tends to smoothen out, over a period of time, due to high velocity flow stream as, for example, in automotive exhaust applications in two-stroke engine vehicle.

In all the earlier references pertaining to the Cordierite catalvst carrier of any form the cordierite precursor is subjected to firing schedule of over 48 to 72 hours which includes the soaking time at the maximum temperature of 1390 to 1410° C. This invention discloses a process wherein the firing schedule of less than an hour yielding >90% Indialite, a high temperature polymorph of cordierite, as the only principal phase in the fired body.

OBJECTS OF THE INVENTION

The principal object of this invention, therefore, is to offer a rapid process for making hollow or solid cellular macro porous 'Indialite' ceramic spheres having hitch crush strength up to 23 lbs.(point load strength) capable of extending crush strength upto 32 lbs. by homogenizing zirconia fibers in the green mass of compositions of Table-1 and burnable core mass for attaining herein stated benefits for use as loose fill catalyst carriers and also which when moulded into refractory bricks and monoliths provide high temperature insulation in refractory applications.

It is further object of this invention to provide a method for production of a highly macroporous Indialite type spherical pelleted or beaded catalyst support that is made of low cost easily available raw materials following a method of pyroprocessing schedule of less than an hour under rotary motion of the spheres in air atmosphere which enables uniform thermal treatment of the pellets and which in turn results in in-situ formation of high temperature polymorph of Cordierite (Indialite) from its precursor materials.

It is yet another object of this invention to provide a method for forming of judiciously proportioned raw materials which yields narrow size distribution of pellets which on sintering in rotary kiln gives rise to Indialite body with less than 5% volume shrinkage, while maintaining high decree of uniformly distributed pores of 1–10 micron size. Other objects are apparent from the herein described process.

The incorporation of zirconia fibers in the homogenised product mix of TABLE-1 is also found to be very effective in bonding together network cage of inter and cross linked macro pores form reinforcement for the said spheres having high crush strength upto 23 lbs psi. In certain cases, the 'Indialite' spheres reinforced with zirconia fibers favourably enhance not only their crush strength upto 32 lbs. but also enhance their catalytic activity to otherwise inert catalyst carriers.

STATEMENT OF INVENTION

Novel process according to this invention for making open or closed cellular macro porous 'Indialite' ceramic spheres with or without a central core cavity cross/inter linked with zigzag macro porous conduits from naturally occurring herein stated TABLE-1 composites homogenized with burnable organic/inorganic core particles forming filler/binder; sprinkling said mass over a pan-pelletizer separately wetted with <2% cold water soluble PVA (Poly Vinyl Alcohol) aqua sol and rolling to form compact green phase of spheres having <25% moisture dry compacting in pelletizer said spheres before air or oven drying at 90–110 deg. C. till said moisture and core particles are partially removed before sintering in a rotary kiln at temp. varying from 1350–1380 deg. C. for 45–60 minute kiln time followed by rapidly cooling down said spheres to ambient temperature before being sieved and recovering >90% sphere yield there from with <5% volume shrinkage and <2% cracks in said spheres having high degree of thermal shock resistance, up to 23 lbs. Crush strength and which is capable of being enhanced to 32 lbs. by addition of zircon fibers while homogenising said mass and forming loose fill catalyst spheres and/or for moulding into bricks/monoliths forming high temp. insulation for use in refractory applications having herein stated TABLES 4, 6 and 8 of product characteristics.

According to one embodiment said macro-porous sphere having there within a central cavity is made by first rolling in a pan pelletizer wetted with PVA aqua sol binder, a ball of burnable core particle of desired core cavity size followed by sprinkling said homogenized mass into said pelletizer to form spheres of desired dimension and compacting before being subjected to two oven/tray drying steps wherein in first step they are air/oven dried at about 30 deg. C. followed by second tray drying step at 90–110 deg. C. till moisture and burnable core particles are partially destroyed and which on being sintered and cooled down to ambient temperature leaving there behind a central pore cavity surrounded by a network of open zigzag macro pores in sphere wall in the manner stated in Example-1 recovers there from loose-fill 'Indialite' spheres having herein stated product characteristics.

The process also includes the step of homogenizing zircon fibers with the product mix of TABLE-1 and burnable core mass and follow the steps of Example-1 to further enhance crush strength of 'Indialite' spheres from 23 to 32 lbs.

In the accompanying SEM (Scanning Electron Microscopic) photomicrograph and XRD scan;

EXAMPLE-1

The process for making 'Indialite' macro porous spheres comprises the steps of

1—Homogenizing herein stated constituents of:

TABLE 1

| CONSTITUENTS | PERCENTAGE BY WEIGHT |
| --- | --- |
| Talc[1] | 15–20% preferably 20 |
| Calcined Talc[2] | 15–20% preferably 20 |
| China Clay[3] | 20–30% preferably 22 |
| Calcined Clay | 20–30% preferably 22 |
| Calcined Alumina[4] | 10–20% preferably 15 |
| Magnesia[5] | 0–2% preferably 1 |
| Total | 100 |

[1]Talc from Udaipur mineral development syndicate ltd., Rajasthan, India ground to - 325 BSS mesh
[2]Talc calcined at 1100 C for 3 hrs.
[3]China Clay from Neem-Ka- Thana, Rajasthan, India
[4]Calcined Alumina - S-Grade from Indian Aluminum Company, Belgaum
[5]Magnesia - Reactive light calcined Magnesia from Israel.

With <20% of combustibles such as Maize Starch the final blend having the particle size distribution as in below stated Table:

TABLE 2

| SIZE IN MICRON | CUMULATIVE % UNDER SIZE |
| --- | --- |
| <2 | 2.5 |
| <4 | 11.7 |
| <10 | 41.5 |
| <15 | 63.0 |
| <20 | 81.6 |
| <25 | 90.0 |
| <35 | 95.0 |
| <45 | 100 |
| Mean D = 50 | 12 |

2—sprinkling homogenized mass of step 1 over a pan pelletizer wetted with cold-water soluble aqua sol containing <2% low ash content PVA (Poly-Vinyl-Alcohol) binder while being rolled to form desired green spheres having <25% moisture and wherein any agglomeration due to coalescence of said mass is mechanically broken and recycled into pelletizer;

3—compacting said spheres in pelletizer by shutting down the spray of said aqua sol and said homogenized mass; dry rolling said spheres in pelletizer before air/oven drying at a temperature varying from 90–110 deg. C. till moisture and core particles get partially destroyed.

Figure 1:
FIG. 1—shows partly enlarged section of SEM micrograph of loose-fill macro porous ceramic spheres having inter/cross linked network of zig-zag open pores formed in sphere wall.

4—sintering oven dried spheres at step (3) through a rotary kiln at temperature varying from 1350–1380 deg. C. for 45–60 minute kiln time with a rotary motion of the pellet in air atmosphere and allowing them to cool down to ambient temp. before being sieved and recovering there from >90% spheres macro porous ceramic spheres having uniformly distributed network of pores marked 'A' (FIG. 1) in black interspersed in ceramic matrix 'B' marked in white separating adjacent pores 'A' forming predominantly mono-phasic low-to-high temperature 'Indialite' spheres distinguished by typical peak as shown in FIG. 4-B having potential application in low-to-high temp. macro porous spheres forming loose fill catalysts and/or in moldable refractory bricks/monoliths forming refractory insulations.

EXAMPLE-2

By way of confirming the importance of using calcined clay, calcined talc and calcined reactive light calcined magnesia in the homogenized raw mix batch of Table-1 constituents use of non-calcined raw clay, talc and reactive magnesia in place of the calcined counterpart is made in the homogenized mass while maintaining identical other constituents in TABLE-1 and followed by steps of Example 1 to produce loose fill macro-porous ceramic spheres having comparative product characteristics in below stated

TABLE 3

| PARAMETERS | INDIALITE SPHERES FROM RAW MIX OF EXAMPLE-1 | INDIALITE SPHERES FROM RAW MIX OF EXAMPLE-2 |
| --- | --- | --- |
| Temp. of firing ° C. | 1350 to 1380 | 1350–1380 |
| Residence time in kiln | 55 Minutes | 55 Minutes |
| Size of pellet | 2.8 to 3.2 mm | 2.8 to 3.2 mm |
| % Broken Pellets | <2% | 45 to 50% |
| Major Phase (XRD) | Indialite | Indialite |
| Oven Drying temperature | <110° C. 4–8 Hours | <110° C. 4–8 Hours |

EXAMPLE-3

By way of establishing the importance of use of organic starch and preferably maize starch content in three separate homogenized batches having identical constituents of TABLE-1 were prepared with 5%, 15% and 25% by weight of starch and process carried out by steps of Example-1 to produce 'Indialite' macro porous spheres with zigzag conduits when sieved and examined for percentage of broken spheres, attrition loss and volume change gave below stated analysis:

TABLE 4

| BATCH | % BROKEN PELLETS | ATTRITION LOSS % | VOLUME CHANGE % | POROSITY % |
| --- | --- | --- | --- | --- |
| Raw Mix as per Ex-I + 5% starch | 7 | 1.0 | 10 | 38 |
| Raw Mix as per Ex-I + 15% starch | <2 | 0.5 | 5 | 47 |
| Raw Mix as per Ex-I + 25% starch | <2 | 25 | 4 | 53 |

EXAMPLE-4

By way of comparison, 'Indialite' spheres obtained from homogenised batch composites of TABLE-1 were sintered in a conventional stationary furnace time schedule in below stated

TABLE 5

('Indialite' spheres sintered in a Conventional Stationary furnace)

| TEMPERATURE RANGE | DURATION (Firing rate) | HOLD TIME |
| --- | --- | --- |
| Room Temp. to 500° C. | 2 Hours | 1 Hour |
| 500° C. to 900° C. | 2 Hours | 1 Hour |
| 900° C. to 1350° C. | 3 Hours | 5 Hours |
| 1350° C. to Room Temp | 18 Hours | — |

EXAMPLE-5

Figure 2:
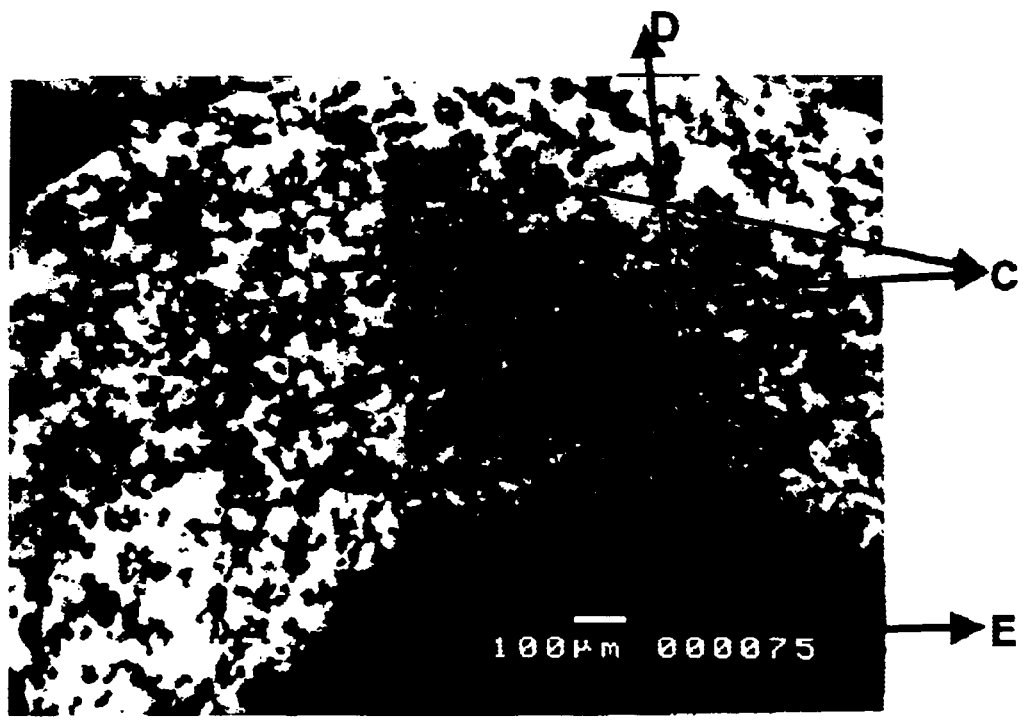
FIG. 2—shows enlarged half section of SEM micrograph shown in FIG. 1 having a central cavity encircled with inter/cross linked zig-zag network of pore conduits formed in sphere wall.
Figure 3:
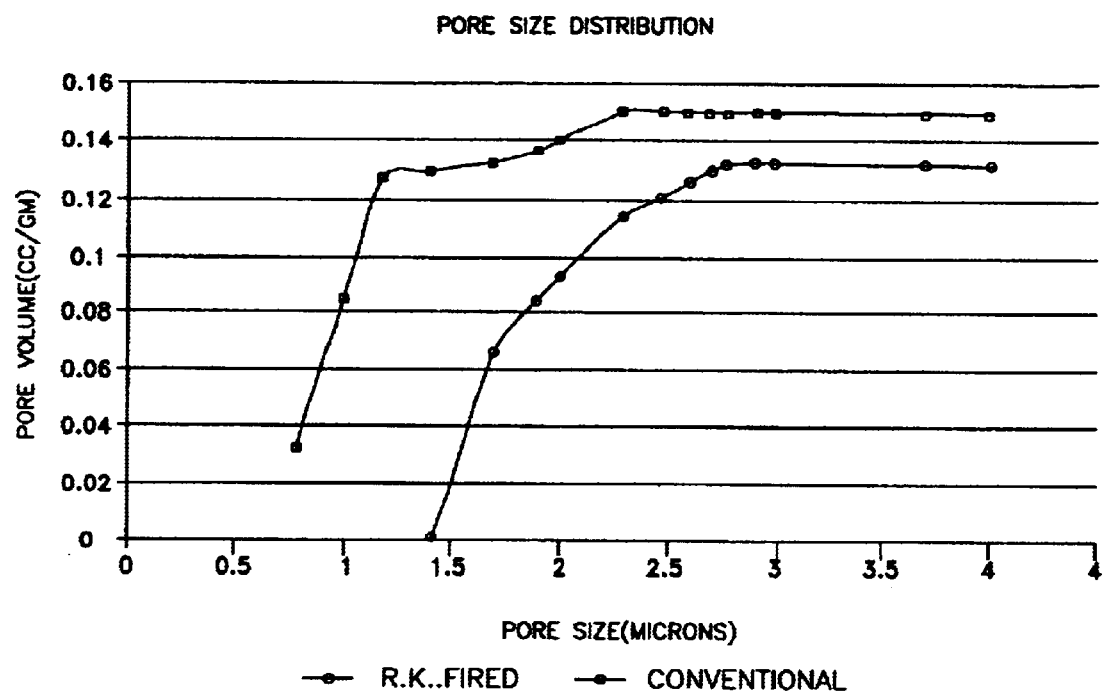
FIG. 3—shows a graph of different pore size distribution in 'cordierite' spheres marked by square box 'Y' obtained by sintering in conventional stationary kiln sintering at 1380–1400 deg. C. for 23–72 hrs. kiln time compared with macro porous spheres marked by diamond box 'Z' in a rotary kiln giving rotary motion to spheres thereby enabling uniform heating at 1350–1380 deg. C. under air atmosphere for 45–60 minute total kiln residence time.

The process of making 'Indialite' spheres (FIG. 2) having a central cavity marked 'E' in black forming hollow sphere core is carried out by first rolling in pan pelletizer precursor beads of burnable mass such as Exfoliated Poly Styrene (EPS) or the like of desired size and subsequently following the procedure explained in example-1 such as agglomerating and compacting by dry rolling them to form spheres in pelletizer till they attain bulk density varying from 0.72 to 0.9 gm/cc and drying first at about 30 deg. C. for 4–8 hrs. followed by tray drying at 90–110 deg. C. temp. for 4–8 hrs. till moisture and burnable core particles there from get partially removed; sintering in a rotary kiln followed by rapid cooling sintered spheres to ambient temp. by steps of Example-1 and sieving and retrieving there from spheres having a central core cavity marked 'E' encircled with a network 'C' of inter and cross linked macro porous zigzag pore conduits marked 'A' separated by Ceramic Indialite matrix 'B' of sphere wall forming partition between adjacent pores 'A' providing high geometric surface area within respective spheres promoting desired degree of turbulence in reacting fluids/gases being circulated through said conduit network in sphere wall of desired thickness marked 'D' during residence time of reaction mixture in catalyst bed.

Figures 4A, 4B:
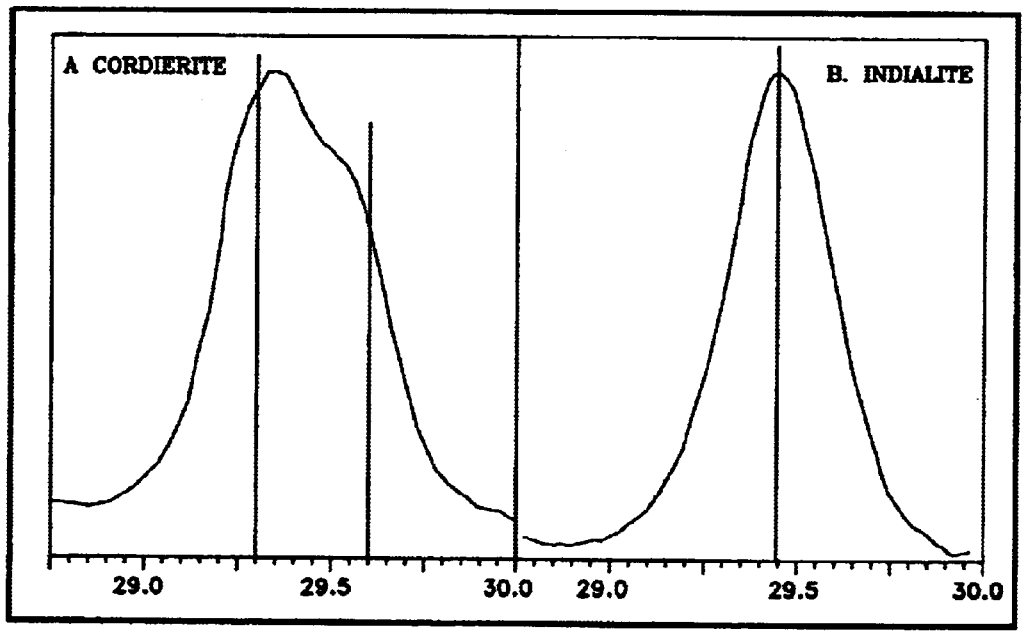
FIG. 4A—shows XRD short scan on 'cordierite' sphere sintered in conventional kiln.
FIG. 4B—shows XRD short scan of 'Indialite' sphere sintered in a rotary kiln.

Said conduit network also provides high crush strength varying from 11–23 lbs. psi. and provides high temperature thermally stable insulation having bulk density of 0.543 gm/cc having product analysis in below stated TABLE-6 and shown in XRD short scan marked in FIG. 4B where CCS (cold crush strength) is capable of being increased up to 32 lbs. psi. by homogenizing raw mix of TABLE-1 composites, core particles and zirconia fibers having bulk density varying from 0.543 to 0.72 gm/cc having product characteristics given in herein below stated TABLES-7 and 8

EXAMPLE-6

In this example the procedure of Example-1 is repeated by pouring fresh charge of raw mix batch of TABLE-1 into a rotary pan pelletizer and growth of the spheres is continued till green phase of spheres attain a bulk density of about 0.81 gm/cc and which on being sintered and cooled down to ambient temperature in open air attain a bulk density of about 0.66 gm/cc having product analysis in below stated TABLE-6 and also having product characteristics of FIG. 4B of accompanying XRD short scan.

EXAMPLE-7

In this example the procedure of Example-6 is further repeated with fresh charge of said raw mix batch into rotary pan pelletiser and growvth of the sphere is continued till said green sphere attains a bulk density of about 0.9 gm/cc which on being sintered and cooled down to ambient temperature attain a bulk density of about 0.72 gm/cc having average crush strength of 25 lbs. psi. and product analysis in herein stated in TABLE-6. The product analysis of the 'Indialite' cellular spheres produced by the examples 5, 6 & 7 is as in herein stated:

TABLE 6

| PROPERTIES | INDIALITE SPHERE OF EX-5 | INDIALITE SPHERE OF EX-6 | INDIALITE SPHERE OF EX-7 |
|---|---|---|---|
| Bulk Density of fired body gm/cc | 0.543 gm/cc | 0.66 gm/cc | 0.72 gm/cc |
| Porosity | 48% | 47% | 49% |
| XRD Major Phase | >90% Indialite | >90% Indialite | >90% Indialite |
| Average Crush Strength | 11 lbs. | 15 lbs. | 25 lbs. |
| Bulk Density of green body | 0.72 gm/cc | 0.81 gm/cc | 0.9 gm/cc |

Though 'Indialite' spheres with >40% macro porosity and 1–20 micron size pores are found to be excellent catalyst carriers because of their ability to pick up and anchor firmly the wash coat and catalyst species, the same features at times lead to unacceptably low crush strength for certain other applications, such as in refractories as high temperature insulation material. A simple approach to overcome this problem is found by homogenizing suitable inorganic fibers such as zirconia fibers with homogenized mass of TABLE-1 and burnable particles and processed by steps in Example-1 to form acceptably strong yet adequately stable open macro porous ceramic spheres having product analysis in below stated TABLE-8. Further, such ceramic spheres with zircon fibers also exhibit desirable impact, crush and fatigue strength varying from 23 to 32 lbs. when used in high temp. refractory insulations.

EXAMPLE-8

This example shows a preferred process for making 'Indialite' spheres reinforced with zirconia fibers wherein said calcined talc and calcined china clay were wct milled with suitable <0.1% by weight of deflocculant such as TAC (Tri-Ammonium-Citrate) to obtain a stable suspension for homogenized mass which contain 80–90% by weight of zirconia fibers varying from 0.5 to 1.0 mm long and about 10 micron thick provide adequate reinforcement for said spheres made by the steps of Example-1 to attain below stated composites:

TABLE 7

With homogenised zircon fibres

| MATERIAL | QUANTITY |
|---|---|
| Raw Mix as per Table-I | 5.0 Kg. |
| Zirconia Fiber* | 0.250 Kg. |
| 2% PVA in aqueous solution | 900 CC. |

*From Murugappa Morgan Thermal Ceramics Ltd., Ranipet, N.N. India and the properties of resultant spheres were compared with the spheres produced without zirconia fibers gave below stated product analysis:

TABLE 8

| PROPERTIES | INDIALITE SPHERES WITHOUT $ZrO_2$ FIBER | INDIALITE SPHERES WITH $ZrO_2$ FIBER |
|---|---|---|
| Bead Size (mm) | 1.2 to 6.0 | 1.2 to 6.0 |
| Zirconia Fiber | Nil. | 5% by Wt. |
| XRD major Phase | Indialite | Indialite |
| Ag. Crush Strength (lbs) | 24 | 32 |
| Porosity % | 45 | 44 |

It is apparent from the above results that small or moderate addition of inorganic material such as Zirconia fibers improves the mechanical properties especially the crush strength of highly porous 'Indialite' spheres without altering their porosity extend its potential application from that of catalyst carrier to high temperature refractory insulations. Considering the chemical stability of zirconia fibers and its well known favourable role in aiding various catalyst activities, their incorporation in the homogenised raw batch mix of TABLE-1 and burnable core therefore prove to be better candidate as a catalyst carrier than 'Indialite' spheres devoid of zirconia fiber.

EXAMPLE-9

By way of emphasizing the need to sinter the 'Indialite' constituents of TABLE-1 in a rotary kiln vis-a-vis conventional stationary furnaces/kiln the identical homogenized mass was sintered in a rotary kiln in accordance with Example-1.

TABLE 9

| PROPERTIES | CORDIERITE SPHERES CONVENTIONAL FIRING* | INDIALITE SPHERES RAPID FIRNG** |
|---|---|---|
| Size of the Pellet (mm) | 2.8 to 3.2 | 2.8 to 3.2 |
| Water Pick-Up % | 35 | 32 |
| Pellet Density (gm/cc) | 1.30 | 1.35 |
| Apparent Porosity % | 46 | 43 |
| Packed Bulk Density (gm/cc) | 0.721 | 0.77 |
| Avg. Crush Strength (lbs) | 25 | 32 |
| Typical Pore Volume (cc/gm) | 0.15–025 | 0.13–0.20 |
| Pore size distribution %: | | |
| 30–15 micron | 56 | 4 |
| 15–5 micron | 28 | 11 |
| 5–1 micron | 14 | 69 |
| 1–0.1 micron | 2 | 16 |
| XRD Major Phase | Indialite | Indialite |

*At 1380 C for 23–72 Hours in stationary furnace as per established processes known in the prior art.
**At 1350 C for 45–60 minutes with rotary motion in kiln as per this invention.

Likewise identical constituents were sintered in conventional stationary tunnel/kiln at temperature varying from 1380 to 1400 deg. C. with kiln retention time varying from 23–72 hrs. and the resultant spheres on being cooled down to ambient temp., sieved and analyzed gave comparative product analysis stated in Table-9 above.

These 'Indialite' ceramic spheres when used as loose fill mass in catalyst applications provide for easy wash coating and metallisation resulting into a uniform dispersion of catalyst species into said zigzag conduits and provides for penetration of catalyst species to the sub surface and prevent them from direct exposure to the poisoning and at the same time favors unhindered diffusion of reactant molecules of the gases or liquids.

The hexagonal to sub angular morphology of said maize starch helps in better pelletization without any agglomeration and its uniform 10–15 micron crystals contribute to form homogeneously distributed zigzag conduits of pores for catalyst wash coating.

It was also observed that use of starch beads with spherical crystals or other morphology tend to cause excessive balling effect and the particles of the raw mix batch tend to coalesce rather rapidly into amorphous mass of uncontrolled size and shape. While the saw-dust with the bulk density of 0.1 gm/cc and EPS with bulk density of <0.25 gm/cc in green phase of said spheres tend to segregate during the mixing in a ball mill and blending of precursor said raw mix batch, while the starch with a bulk density at least 5–10 times higher than that of saw-dust, homogenizes well with the rest of the raw mix batch as their bulk densities are also in the proximity to said maize starch particles While we have shown here one typical formulation for achieving desired sphere strength, porosity and sphericity for ceramic spheres, it is to be expressly understood that any variety of other formulations can also be used by any person skilled in the art to suit individual catalyst and/or refractory applications within the prescribed parameters in herein stated tables and accompanying shown in accompanying SEM and XRD short scan of said spheres to attain herein stated ultimate objects.

What is claimed is:

1. Process for making macro porous ceramic spheres with or without a central cavity having cross/inter linked web of macro porous zigzag conduits embedded in the sphere comprising
   dry pulverizing a composition comprising talc, calcined talc, china day, calcined clay and calcined alumina homogenized with <20% combustible particles to form filler-binder;
   uniformly sprinkling said homogenized mass in a pan pelletizer separately wetted with cold water mixed <2% PVA aqua sol binder while being continuously rolled there within to forming green spheres with <25% moisture and burnable core particles;
   dry roll compacting said green spheres before oven drying at 90–110 deg. C. until moisture and burnable core particles are partially removed therefrom before being sintered in a rotary kiln at temperature between 1350 and 1380 deg. C. for 45–60 minute kiln time duration, giving a rotary motion to the spheres which enables uniform thermal treatment in air atmosphere allowing said sintered spheres cool down rapidly to ambient temperature before sieving, and
   recovering therefrom >90% ceramic spheres with <5% volume shrinkage and <2% cracked/broken spheres ideal for uses as low-to-high temperature loose fill catalyst carriers for mobile or stationary application or for being moulded into bricks/monoliths forming high temperature refractory applications having product characteristics comprising indialite as the XRD major phase and an average crush strength of 11 to 32 pounds.

2. Process as claimed in claim 1 wherein network of zigzag labyrinth passage within said macro porous spheres for supporting and circulating there through low-to-high temperature oxidation and reduction catalysts.

3. Process as claimed in claims 1 or 2 wherein a network of zigzag pore conduits is formed in respective spheres moulded to form refractory bricks/monoliths provide passages for circulating therethrough low-to-high temperature air/gas form refractory insulations.

4. Process as claimed in claims 1 or 2 wherein the burning is conducted so that macro pores left behind by burning said core particles and combustibles whose proportions are <25%.

5. Process as claimed in claims 1 or 2 wherein said sphere having therein formed central core cavity is formed in a pan pelletizer by first rolling spheres of burnable core particles before coating them with the homogenized mass in said pelletizer separately wetted with herein stated PVA aqua sol and rolling them to form green spheres.

6. Process as claimed in claim 5 wherein said compacted green spheres with central rolled ball of burnable core are subjected to first air drying at <30 deg. C. temp. and subsequently oven dried at <110 deg. C. until said moisture and core particles are partially destroyed before rapid sintering said dried spheres in a rotary kiln.

7. Process as claimed in claims 1 or 2 wherein the crush strength of said ceramic spheres with or without hollow sphere core is enhanced by homogenizing a suspension of inorganic fibers and deflocculant to form green spheres before being oven dried and sintered in rotary kiln.

8. Process as claimed in claim 7 wherein said fibers comprise zirconia.

9. Process as claimed in claim 8 wherein the deflocculant is tri ammonium citrate.

10. Process as claimed in claim 1 further calcining raw talc, clay and reactive magnesia at a temperature varying from 1000–1100 deg. C. for <3 hours prior to said dry pulverizing.

11. Process as claimed in claim 1 wherein formation of the green spheres is continued until they attain desired bulk density of about 0.810 gm/cc.

12. Process as claimed in claim 1 wherein rolling and growth of said homogenized green spheres in the pan pelletizer is continued until they attain bulk density varying from 0.72 to 0.9 gm/cc and the total sintering schedule is from 45–60 minute kiln time in a rotary kiln with rapid cooling to attain bulk density varying from 0.543 to 0.72 gm/cc.

13. Process as claimed in claim 1 wherein said composition comprises 15–20% talc, 15–20% calcined talc, 20–30% china day, 20–30% calcined clay, 10–20% calcined alumina and 0–2% magnesia.

* * * * *